United States Patent Office 2,761,792
Patented Sept. 4, 1956

2,761,792

PROCESS FOR PREPARING ALUMINUM CABLES FOR SOLDERING

Rene D. Wasserman, Stamford, Conn., assignor to Eutectic Welding Alloys Corporation, New York, N. Y., a corporation of New York No Drawing. Application June 13, 1952,
Serial No. 293,427

4 Claims. (Cl. 117—50)

This invention relates to the preparation or pretreatment of aluminum base metals for a subsequent soldering operation. More particularly, the invention relates to a new process or method for preparing aluminum cables for soldering by conventional soldering compounds.

Aluminum cables are extensively used in power communications for conveying electrical current over long distances. These cables normally consist of a plurality of strands of aluminum which are twisted or woven into concentric conducting layers, one within the other, the composite layers forming a metal core portion which is subsequently covered with conventional insulating medium. As is well understood in the art, aluminum, when exposed to the atmosphere or various types of chemical actions, forms a heavy oxide surface coating which has a much higher melting point than that of the base aluminum metal. As a consequence, aluminum cannot be soldered by conventional soldering compounds or methods unless it has been carefully cleaned, and normally mechanically scraped, to remove all of the oxide formation. This cleaning process has been laborious and difficult, and as a result aluminum has seldom been fabricated by a soldering procedure, although special solders for aluminum are commercially available.

The problem of cleaning aluminum cables is further complicated by the constructional features thereof. As before stated, the cables consist of closely-packed, twisted strands of aluminum which are formed into separate concentric conducting layers. It will be apparent that there will be a plurality of minute and separated interstitial spaces between the adjacent concentric layers and between adjacent strands within each layer. As a consequence, foreign matter, such as dirt, grit and corrosion as well as the oxide formation forms in these minute and inaccessible regions and is almost impossible to remove therefrom.

A further factor limiting the use of conventional solders as a joining material between base aluminum metals is the fact that the aluminum base will not readily form a tight bond with the normal constituent elements of commercial solders. As a result, almost all aluminum fabrication has been by welding processes of one kind or another although a relatively minor amount is done with special solders for aluminum. These, however, are very expensive and require much effort and particular skill to apply properly.

The prior methods for preparing aluminum surfaces for soldering have involved three distinct steps. The first step has consisted of a pre-cleaning in which the aluminum is first mechanically scraped or cleaned and then subjected to an acid cleaning or an etching action. One form of acid cleaning often used consists of a thirty-second dip in a 5% sodium hydroxide solution which is maintained at a temperature of 150° F., a subsequent rinse in cold water, a redipping for one minute in a 50% nitric acid solution maintained at room temperature, and a final rinsing in first cold and then boiling water prior to drying. A second frequently used acid cleaning treatment is actually an etching process in which gum tragacanth is dissolved in denatured alcohol and combined with 30% hydrofluoric acid and water to privide a very strong etching bath. This latter treatment normally requires only a thirty-second time phase, but the aluminum part must also be thoroughly rinsed in both hot and cold water in the usual manner with an attendant loss of time. Subsequent to the cleaning operation, the aluminum part is soldered with a special aluminum soldering compound to a like prepared aluminum surface. After the soldering operation is completed, it has been the general practice to clean the soldered parts first by brushing with hot water followed by a fresh-water rinse and then dipping the soldered parts into a bath of either a cold 10% sulphuric acid solution for thirty minutes, or a hot 5% sulphuric acid bath maintained at approximately 150° F. for between five and ten minutes, or a cold 10% to 50% nitric acid solution for ten to twenty minutes. This second cleansing bath has necessarily been followed by subsequent rinses in fresh water.

From the above, it will be readily appreciated that the time involved in preparing an aluminum part for soldering and subsequently cleaning the part is practically prohibitive for any commercial application and has other limitations with respect to the size of the parts soldered and the size of the dipping or bathing facilities available. Further, the bond obtained between the aluminum parts has not been very strong and aluminum elements so connected have been relegated to minor industrial roles.

The present invention has for its primary purpose the provision of a simple three or four-step method for preparing metallic aluminum, particularly aluminum cables, for a subsequent soldering operation. The invention may be described generally as consisting of a first step in which a chemical treatment is applied to the base aluminum to simultaneously clean it and deoxidize the heavy oxide coating thereon, a second step in which the clean base aluminum is pre-alloyed with a second protective metal having a high affinity for aluminum, and a final step in which the alloyed base metal is deoxidized, cleaned and prefluxed in preparation for a subsequent tinning operation. If desired, a fourth step may be incorporated in which the alloyed aluminum base is tinned with a coating of a conventional solder composition in order to form a firmly adhering surface which can easily and readily be connected to a second like prepared surface by the simple expedient of applying solder in a molten state thereto. This latter step is not essential, however, since the pre-alloying action of the second step provides a film or plating which is sufficiently protective to prevent contamination of the surface thereof and which has reasonable affinity for most types of commercial solders. It will thus be understood that the pre-alloyed base metal may be readily joined with a like prepared base metal by a direct soldering operation without the need for a tinning step.

Accordingly, one object of the instant invention is the provision of a simple and expedient method for cleaning and preparing aluminum parts for soldering. A still further object of the instant invention is the provision of separate compositions which, when used sequentially in the disclosed manner, produce a tinned aluminum surface having a high affinity for most commercial solders. A still further object of the invention is the provision of a simple kit or package containing all of the necessary compositions for effectively soldering aluminum parts with a resultant firm and durable bond therebetween. Still other objects will be apparent from the following description and claims.

Broadly, the invention may be defined as consisting of a pre-cleaning or chemical treatment step in which the aluminum base metal is treated with an acid fluoride deoxidizing and cleaning solution, a pre-alloying step in which the base metal is treated with an autocatalytic nickel plating solution, a final cleaning and fluxing step in which the plated base metal is cleaned with an alcohol-rosin flux solution, and a tinning step in which the cleaned, plated base metal is tinned with a conventional solder composition. As stated previously the latter step may be dispensed with if desired.

The pre-cleaning or chemical treatment substance preferably consists of an acid silico fluoride solution which may be compounded from an aqueous solution by adding magnesium silico fluoride and selected amounts of an alkali metal monobasic phosphate and an alkali metal bisulfate. The ingredients are preferably supplied in dry powdered form and dissolved in the aqueous solution.

The pre-alloying substance is preferably in the form of an aqueous solution of nickel salts, alkali metal hypophosphites, and a material for holding the nickel salt in solution. This holding action may be supplied by an alkali metal salt of an organic acid, a hydroxy organic acid, or by an ammonium salt. The alloying solution may be prepared by pouring the salts and hypophosphites in powdered form into the aqueous solution with a slight agitating action to produce a homogeneous dispersal therein. The pH range of the solution may vary widely but should be maintained between 3 and 10.

The cleaning and fluxing solution may take various forms but it is preferred to use a high grade rosin which may be dissolved in one of the lower alcohols, preferably methyl or ethyl, to which are added small amounts of organic amino reducing agents.

Having described my invention in general terms, I shall now particularly describe it by illustrating specific compositions for producing the above-noted results. The base metal chemical treatment composition or cleaner and deoxidizer may consist of a water solution containing a composition composed within the following percentages by weight of:

| | Per cent |
|---|---|
| Magnesium silico fluoride ($MgSiF_6.6H_2O$) | 5 to 30 |
| Sodium or potassium phosphate monobasic ($NaH_2O_4$ or $KH_2PO$) | 5 to 30 |
| Sodium or potassium bisulphate ($NaHSO_4$ or $KHSO_4$) | 40 to 90 |

Preferably, the cleaning composition is dissolved into the water while the water is at boiling temperature in the proportion between one-fourth (¼) and two (2) pounds per gallon of water. The solution so formed may be applied to the aluminum base by a continuous brushing or wiping action thereover; or, alternatively, the aluminum cable may be repeatedly dipped into a bath containing such compound. In general, the cleaning step takes no more than five minutes to complete its necessary action. The silico fluoride readily attacks the oxide coating while the alkali metal salts decompose the mineral constituents found in the grime and slag of the corroded aluminum surface. This treatment cleans, deoxidizes and prepares the aluminum for the subsequent pre-alloying treatment.

Subsequently the cleaned cable is dipped into a bath containing the following composition dissolved therein, the composition being listed in percentages by weight:

| | Per cent |
|---|---|
| Nickel chloride or nickel sulfate ($NiCl_2.6H_2O$ or $NiSO_4.6H_2O$) | 0.5 to 10 |
| Sodium or potassium hypophosphite ($NaH_2PO$ or $KH_2PO_2.H_2O$) | 0.5 to 10 |
| Ammonium chloride ($NH_4Cl$) | 5 to 30 |
| Sodium salts of organic acids | 10 to 40 |
| Potassium hydroxide | 2 to 10 |
| Water | 50 to 80 |

All ingredients, in the indicated proportions, are dissolved in the required amount of water, and after complete solution thereof the required proportion of potassium hydroxide or an equivalent inorganic base activator is added thereto to adjust the pH to the desired value. The amount of potassium hydroxide will vary, dependent upon the desired pH which is to be maintained in the bath. In general, the plating action is much speedier with a pH above 7, but is also operative when the pH is as low as 2. Preferably, the temperature of the water should be between 90° and 100° C., but such temperature requirement is not critical, at least until below a temperature of 20° C. The ammonium salt and/or the salt of the organic acid hold the nickel salts in solution until chemical reduction occurs. Upon disassociation the hypophosphite radical rapidly reduces the nickel ion in the presence of the aluminum base which also aids the autocatalytic action of the nickel, particularly at higher temperatures of the solution.

In view of the fact that the necessary plating or film required in the instant contemplated use is very thin, it is never necessary that the cable remain in the bath more than fifteen minutes and an efficient contact plating or film is often formed within seven and one-half minutes. A sufficient amount of nickel ions will plate out in this allotted time and provide a homogeneous composite surface film or coating which will completely surround the aluminum surface of the cable. This treatment pre-alloys the aluminum with a nickel film tightly adhered thereto, which film is readily bonded with any commercial solder.

After the pre-alloying step is completed, the alloyed aluminum is deoxidized, cleaned and fluxed so as to prepare it for the fourth or tinning step. Even if it is not desired to pre-tin the alloyed base metal, it is still necessary to clean the surface metal of all remaining corrosive ingredients, particularly sulphates, fluorides, and chlorides. In order to do this, it is proposed to use a composition as follows, the percentages being by weight.

| | Per cent |
|---|---|
| Rosin (water white or equivalent) | 10 to 60 |
| Ethyl or methyl alcohol ($CH_3OH$ or $C_2H_5OH$) | 40 to 80 |
| Methylamine hydrochloride ($CH_3NH_2.2HCl$) | 0.25 to 10 |
| Hydrazine dihydrochloride ($NH_2)_2.2HCl$ | 0.5 to 2 |

This solution may be applied to the plated base metal either by brushing or wiping thereon; or, alternatively, the base metal may be dipped in a solution thereof. The required lapse of time during which the composition must remain in contact with the alloyed metal, in order to completely deoxidize and flux it, is less than a minute, although the dipping action may be repeated as desired. This step completes the preparation of the aluminum for subsequent connection with like prepared sections, and, if desired, the treated metal may be put aside without further work thereon for a future soldering operation. The cleaned nickel film is non-corrosive and will protect the base aluminum metal while retaining a clean surface over a substantially long period of time. The organic amino compounds merely act as reducing agents and will not attack the nickel film.

In most commercial operations, however, it will be desirable to tin the plated aluminum to insure a complete and firm bond between like prepared cables. To accomplish this, it is proposed to use a commercially available soldering compound which has been demonstrated to form a firm adherent connection with a nickel base. The compound may consist of a commercial solder which has proven highly effective in practice and which has the following elements in the indicated proportions, the percentage being by weight:

| | Per cent |
|---|---|
| Tin | 30 to 80 |
| Lead | 20 to 70 |
| Indium | .005 to 1 |

The solder may be applied to the alloyed aluminum either as a molten bath or by dipping. This process, due to the special nature of the alloy, and because of the previous treatment, tins the aluminum with a firm adherent coat.

It will be apparent that the four step process is of particular utility when applied to aluminum power cables, especially the pre-alloying or nickel-plating step which coats the interstitial spaces or crevices between the separate strands of aluminum cable with a firm adherent nickel film and forms a basis for solidly bonding a subsequent solder deposit therewith. The strong bond between the nickel film and the aluminum base metal is largely due to the exceedingly effective action of the magnesium halides contained in the pre-cleaner or chemical treatment composition. As is well known, magnesium is a highly active deoxidizer and in the halide form is extremely effective in breaking down the aluminum oxide coating on the surface of the base aluminum.

One convenient and exceedingly expedient means for providing the necessary constituents for the instant process is the provision of a special kit containing the necessary ingredients for the four steps of the instant process. It is proposed to package the chemical elements of the pre-cleaning or chemical treatment step and those of the pre-alloying or plating step into separate packages of powdered constituents compounded in the indicated ratios. The separate compositions may be provided in any desirable quantity, preferably proportioned with respect to each other for combination with water to treat equal amounts of base metal. A third package will contain the potassium hydroxide pH adjustor or an equivalent inorganic base activator, a fourth package will contain the alcohol-rosin solution for the deoxidizing and fluxing action of step three, while a fifth package will contain the soldering composition in either solid or powdered form. The separate packages may be grouped together in a single container or kit, which would contain all necessary ingredients for completely treating and preparing aluminum cables, with the exception of water. It will be readily appreciated that this innovation will materially reduce the time necessary to prepare aluminum parts for soldering. One of the factors which renders this type dispensing medium feasible for the first time in the metals fabricating field is the complete elimination of handling, storing, etc., dangerous and corrosive fluid acids, such as nitric and sulphuric acids, prior to the treating process. All that a workman need do to obtain the necessary fluid solutions is to dissolve the dry and safely handled chemical treatment and pre-alloying compositions in separate water solutions according to simple directions. This completely eliminates the carrying, dumping, etc., of dangerous acid fluids. The entire treating process from the initial dissolving of the separate compositions to the final tinning of the aluminum base parts may be completed in less than twenty minutes.

A distinguishing feature of the present invention is the complete elimination of the normally requisite additional steps of rinsing and washing in several, separate hot and cold fresh waterbaths, in addition to the time-consuming chemical dipping treatments. When using the instant process, a single aluminum cable end may be prepared for connection with an identical cable end in less than fifteen minutes. This reduction in time for completely preparing an aluminum cable for soldering is substantially half of the time required in the prior art final cleaning step alone.

The value of the instant process will be more readily appreciated when it is recognized that a plurality of aluminum cable sections may be simultaneously prepared without substantially increasing the time of preparation over that required for a single cable end. In this respect, the pre-cleaning or chemical treatment solution, the autocatalytic nickel-plating solution, the deoxidizing and fluxing solution, and the tinning composition may all be formed as separate baths in suitable juxtapositioned containers in which the separate steps may be performed upon plural cables simultaneously and sequentially.

A second feature of the instant invention is the provision of a fool-proof process for obtaining a solid and strong bond between an aluminum base metal and any type of solder with the complete elimination of any danger of subsequent corrosion. The sequential application of the particular chemical constituents utilized results in a finished metal surface which is free of all corrosive compounds or elements, the elements which would tend to corrode the aluminum base being effectively neutralized by the sequential steps.

It will be further understood that the instant process is not restricted to cabling, but may be used to prepare other aluminum parts, such as pipes, rods, bars, channels, sheets, etc. In this respect another distinguishing feature of the invention is its effect on the metals fabricating industry. Prior to the instant invention it was practically impossible to secure a good solder bond on an aluminum base and as a consequence little use was made of aluminum as an adjunct to other type metals in fabricating various metallic structures. Now, by reason of the strong adherent bond produced between the aluminum base and the solder metal according to the instant invention, aluminum metal parts may be readily and speedily soldered to other dissimilar metals, such as iron, steel, copper, zinc, lead, etc., to fabricate metallic structures of lighter weight without the necessity for costly welding operations. The innovation made possible by the instant process is particularly advantageous in the toy and novelty fabricating industries.

Other substantially equivalent autocatalytic nickel-plating compositions may be used in the pre-alloying compound, such as those listed in U. S. Letters Patent 2,532,283, issued December 5, 1950, to Abner Brenner et al. It is also contemplated that other alkaline halides may be used in lieu of the magnesium silico fluoride in the pretreatment composition, but these should preferably contain silica as a constituent thereof. Other equivalent alkaline salts and acid salts for use with the alkaline halide will be apparent to those skilled in the art, such as ammonium salts and carboxylic salts, respectively.

In lieu of the rosin-alcohol cleaner, deoxidizer and flux of step three, it is possible to use a "cut acid flux," with or without a wetting agent such as glycerin. Alternatively, any of the lower alcohols or any common organic solvent may be utilized in lieu of the ethyl or methyl alcohol as a vehicle for the rosin. The organic amino reducing agents of this latter composition may be replaced with equivalents such as ethylamine, propylamine, ethylene-diamine or butylamine hydrochlorides, and phenyl-hydrazine, methyl-hydrazine or o-tolyl-hydrazine dihydrochlorides.

The foregoing is to be understood as illustrative and not all-inclusive as this invention includes all modifications and embodiments not specifically recited herein but coming within the scope hereof and of the appended claims.

What is claimed is:

1. A four-step process for preparing aluminum metal parts for soldering, consisting of sequentially treating an aluminum base metal with a magnesium silico halide pre-cleaning and deoxidizing solution, a subsequent autocatalytic contact nickel-plating solution for a period sufficient to deposit a surface film of nickel on the aluminum, a subsequent deoxidizing, fluxing and cleaning rosin-alcohol flux solution, and a final tinning operation with a solder compound.

2. A method of preparing aluminum cables for soldering, consisting of pre-cleaning the surface of the aluminum cable by a chemical treatment with a solution containing magnesium silico fluoride and an acid alkali metal salt, subsequently contact plating said cable with a film of nickel by an autocatalytic reaction with nickel ions in an aqueous hypophosphite solution, and then cleaning said plated cable with a rosin-alcohol flux containing a reducing agent.

3. A method of preparing aluminum for soldering consisting of chemically treating the aluminum with a solution containing in acid silico halide, subsequently autocatalytically plating said aluminum with nickel, and then cleaning said plated aluminum with a fluxing compound.

4. The method set forth in claim 3 including the additional step of tinning said cleaned and plated aluminum with a solder compound.

References Cited in the file of this patent

UNITED STATES PATENTS

| | | |
|---|---|---|
| 1,359,010 | Williams | Nov. 16, 1920 |
| 1,975,818 | Work | Oct. 9, 1934 |

FOREIGN PATENTS

| | | |
|---|---|---|
| 397,095 | Great Britain | Nov. 11, 1931 |

OTHER REFERENCES

Einerl et al.: Fluxes for Aluminum Alloys, The Chemical Age (London), 46, pages 181–3.